United States Patent [19]

Lawrence

[11] Patent Number: 5,179,490

[45] Date of Patent: Jan. 12, 1993

[54] GROUND-SAFETY CONTROLLER

[75] Inventor: Lucas G. Lawrence, San Bernardino, Calif.

[73] Assignee: Daniel J. Bondy, Las Vegas, Nev.

[21] Appl. No.: 790,552

[22] Filed: Nov. 12, 1991

Related U.S. Application Data

[63] Continuation-in-part of Ser. No. 520,274, May 7, 1990, Pat. No. 5,105,325.

[51] Int. Cl.$^5$ .............................................. H02H 3/14
[52] U.S. Cl. .......................................... 361/42; 361/50
[58] Field of Search ..................... 361/42, 43, 44, 45, 361/46, 47, 48, 49, 50, 93

[56] References Cited

U.S. PATENT DOCUMENTS

| | | | |
|---|---|---|---|
| 4,138,707 | 2/1979 | Gross | 361/45 |
| 4,231,372 | 11/1980 | Newton | 361/42 |
| 4,429,338 | 1/1984 | Becker et al. | 361/42 |
| 4,783,713 | 11/1988 | Chen | 361/48 |

Primary Examiner—Sharon D. Logan
Assistant Examiner—C. Schultz
Attorney, Agent, or Firm—Christie, Parker & Hale

[57] ABSTRACT

A ground fault interrupter circuit is disclosed, comprising a high-voltage input from a public utility transformer, polarity reversal means coupled to the high-voltage input with polarity-switchable output coupled through a thyristor to a relay means. Radio frequency (RF) detection means are coupled to the thyristor gate, causing the thyristor to energize the relay and interrupt load power when radio frequency interference is detected from the load. The RF detector means comprises a plurality of RF chokes and resistor-capacitor pairs feeding a rectifier diode coupled to the thyristor gate. When RF is detected, the diode feeds negative direct current to the thyristor gate, interrupting conduction of the thyristor and the LOAD.

25 Claims, 2 Drawing Sheets

GROUND-SAFETY CONTROLLER

RELATED APPLICATION

This is a continuation-in-part of U.S. application Ser. No. 07/520,274 filed May 7, 1990, now U.S. Pat. No. 5,105,325.

FIELD OF THE INVENTION

The invention relates to ground-fault interrupter systems and to the sensing of the grounding of electrical equipment. The invention specifically relates to a system for discontinuing power to high-voltage A.C. electrical equipment when true earth grounding of the equipment is interrupted and when radio frequency interference is present.

BACKGROUND OF THE INVENTION

Ground safety controllers are used to protect against anomalous electrical conditions which may arise when an electric voltage is impressed upon equipment with respect to the ground. If there is ineffective grounding, a dangerous electrical shock can result which may cause injury or death.

Various devices to interrupt power are available to prevent such incidents. They generally include differential amplifiers, transformers, optoisolators, or similar systems. Usually, however, such systems operate only after the fault situation has occurred. For example, an inverter-type ballast with built-in differential current transformer to sense substantive differences in currents flowing from each of two output terminals is disclosed in Nilssen U.S. Pat. No. 4,855,860. Wilson U.S. Pat. No. 4,093,977 discloses a self-powered, self-contained ground fault protective device with a circuit for monitoring ground fault current, and a ground integrity monitor for an electric apparatus is disclosed in Volk, Jr. U.S. Pat. No. 3,996,496.

Several prior art references disclose transformer isolation ground fault circuit breaker apparatus, including Miyazaki et al. U.S. Pat. No. 4,234,900, Davidson et al. U.S. Pat. No. 4,344,100, and Legatti U.S. Pat. No. 4,598,331. However, transformer-isolated circuitry is unsuitable for ground fault circuit interrupters used in connection with high-voltage-output equipment. Such circuits do not provide adequate isolation against feedback or backflash of the high voltages output by certain equipment. For example, when transformer-isolated ground fault circuit interrupter circuits are used in connection with termite control apparatus, a high-voltage backflash of over 100,000 volts can be impressed on the transformer circuitry. The circuits of Legatti, Miyazaki et al., and Davidson et al. each include low-voltage semiconductor circuits and other sensitive parts which would be destroyed under a backflash of several thousand volts. The same disadvantage is shared by Wilson U.S. Pat. No. 4,034,267, which discloses a closed-loop core structure current transformer providing rectified, low-voltage D.C. to a plurality of operational amplifiers and transistors.

The high-voltage termite control apparatus contemplated for use with the circuit of the present invention is disclosed in Lawrence U.S. Pat. Nos. 4,223,468, 4,366,644 and 4,782,623, each assigned to the assignee hereof. Each of the cited Lawrence patents discloses a high-voltage termite control apparatus using a probe gun incorporating circuitry for generating an electric signal having a voltage in the 100,000 volt range, and a frequency range of 0 to 500 kHz.

It is desirable to provide a system in which total disablement of the equipment occurs if a true earth-ground is absent, and for immediate interruption of equipment functions if electro-magnetic interference is generated.

It is also desirable to provide a circuit which can warn a user of an equipment load coupled to the circuit that a fault exists in the equipment, such as an abnormally long arc. In such a case, large amounts of radio frequency (RF) interference are generated which can impede proper operation of the equipment. Thus, those skilled in the art would appreciate a ground fault interruption circuit capable of interrupting power to a load when RF interference is detected.

SUMMARY OF THE INVENTION

The invention provides a system for interrupting power to electrical equipment when grounding of the equipment is interrupted. In accordance with the invention, a system is provided for preventing application of power to the equipment if a true earth ground is absent, and also for disabling the equipment if a true earth ground is present but the equipment generates radio interference during its operation. The invention can be implemented in a circuit which comprises: a source of electric power provided on hot, neutral, and ground lines; polarity reversing means coupled to first and second input lines from the electric power source, the polarity reversal means having two output terminals, a first output terminal being connected to the cathode of a thyristor and coupled to a true earth ground, and a second output terminal coupled to one terminal of a relay coil; a thyristor having an anode terminal connected to the other terminal of the relay coil, and a gate coupled to a high-impedance safety path; radio frequency detection means for sensing RF interference on the ground, hot, and neutral lines and for triggering the thyristor to interrupt power to the load when interference is detected; and relay switching means coupled to a load for interrupting power at the electrical equipment when triggered by the thyristor or when grounding of the equipment is interrupted.

The invention is especially useful where appliances and industrial machines are involved. In a presently preferred application of the invention, the ground-safety controller of the invention may be advantageously employed with high-voltage termite control devices such as are disclosed in U.S. Pat. Nos. 4,233,468, 4,366,644 and 4,782,623. Such devices operate to control pests such as termites by the application of broad-band, high-voltage electrical energy to the shelter tubes harboring such pests and to the pests themselves. These apparatus generally comprise a probe gun incorporating circuitry for generating an electric signal having a voltage in the 100,000 range and a frequency range of 0–500 kHz. In such applications, it is especially important not only to protect equipment operators against electrical shock due to ungrounded equipment, but also to prevent equipment damage such as may be caused by internal arc-overs resulting from lack of grounding. Such arc-overs result in generation of radio frequency interference detectable by the invention. Because of the especially hazardous situations in which the equipment is used, it is particularly important to employ very reliable ground-safety controllers.

The system of the invention incorporates the high-gain characteristics of thyristors to reliably sense low ground-fault leakage currents. Moreover, the invention enables manual selection of the proper polarity of the feeding power line using the polarity reversal means. The gate circuit of the thyristor may be energized by direct current feed on a high-impedance path from the ground line, or the direct current feed may be shunted and turned off by a diode in the feeder line.

If high frequency currents are present, the diode conducts, and its low electrical resistance shunts the thyristor gate causing the relay to open the power line. Since only micro-amperes are utilized in all sensing functions, the ground-safety controller of the invention creates no electrode biological hazards to equipment operators.

DESCRIPTION OF THE PREFERRED EMBODIMENT

In the following detailed description of the invention, certain specific terminology is used for the sake of clarity. However, the invention is not limited to the specific terms so selected, but rather includes all technical equivalents operating in a substantially similar manner to achieve a substantially similar result.

Field application of high voltage discharges for pest control often requires working with electrical input sources of unknown reliability. The ground fault interrupter of this invention must operate under unknown electrical characteristics with portable equipment. In the field, pest control personnel often work without hard-wired ground lines, reference currents, or 3-wire grounded sockets.

Figure 1:
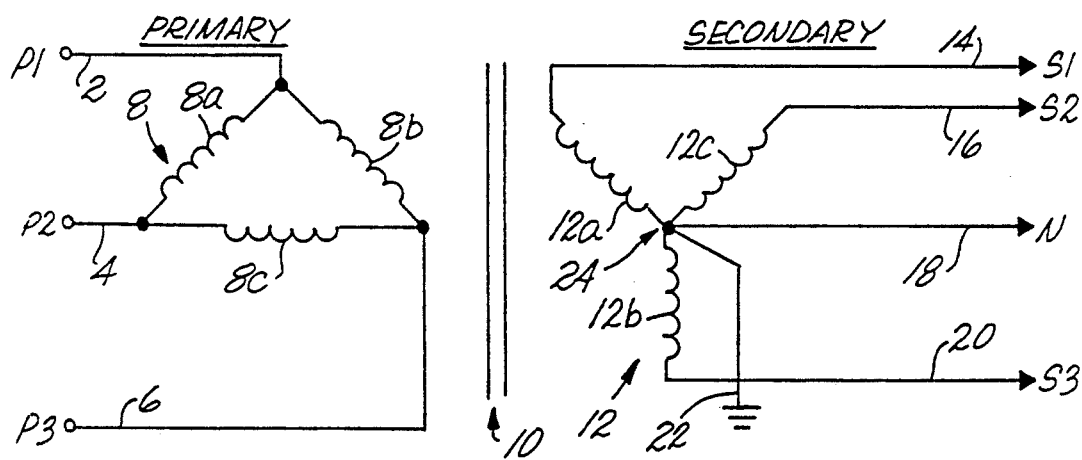
FIG. 1 is a schematic diagram showing a typical public utility high-voltage stepdown transformer circuit.

Domestic residential electric power is usually provided from a pole-mounted public utility transformer electrically constructed as shown in FIG. 1. Line voltage of about 12,500 volts A.C. is provided to a transformer 10 on three input lines P1, P2, P3 and is fed on lines 2, 4, 6 to a transformer primary 8 wound in a "delta" or triangle configuration. Three primary windings 8a, 8b, 8c form sides of the triangle.

A transformer secondary 12 provides low voltage A.C. output on lines 14, 16, 18, 20. Three secondary windings 12a, 12b, 12c are arranged in a wye or star configuration shown in FIG. 1. A center tap 24 of the secondary is coupled to true earth ground using line 22. Thus, if a person accidentally touches any of lines 14-20 while grounded, a complete circuit is formed and a severe shock will result.

As shown in FIG. 1, lines 14, 16, 20 are hot with respect to natural line 18 and provide A.C. output on three phase lines S1, S2, S3. Typically, 117 VAC is present across each of lines 14, 16, 20 and natural line 18. Across lines 16 and 20, 220 VAC is usually present.

If a domestic residence is provided with ungrounded 2-wire interior electric outlets, which is typical in most homes built before 1940, safety requires establishing a local true earth ground. As is known in the art, such a ground can be established by coupling chassis ground of an electrical apparatus to a cold water pipe or a conductive spike driven into the ground.

Figure 2:
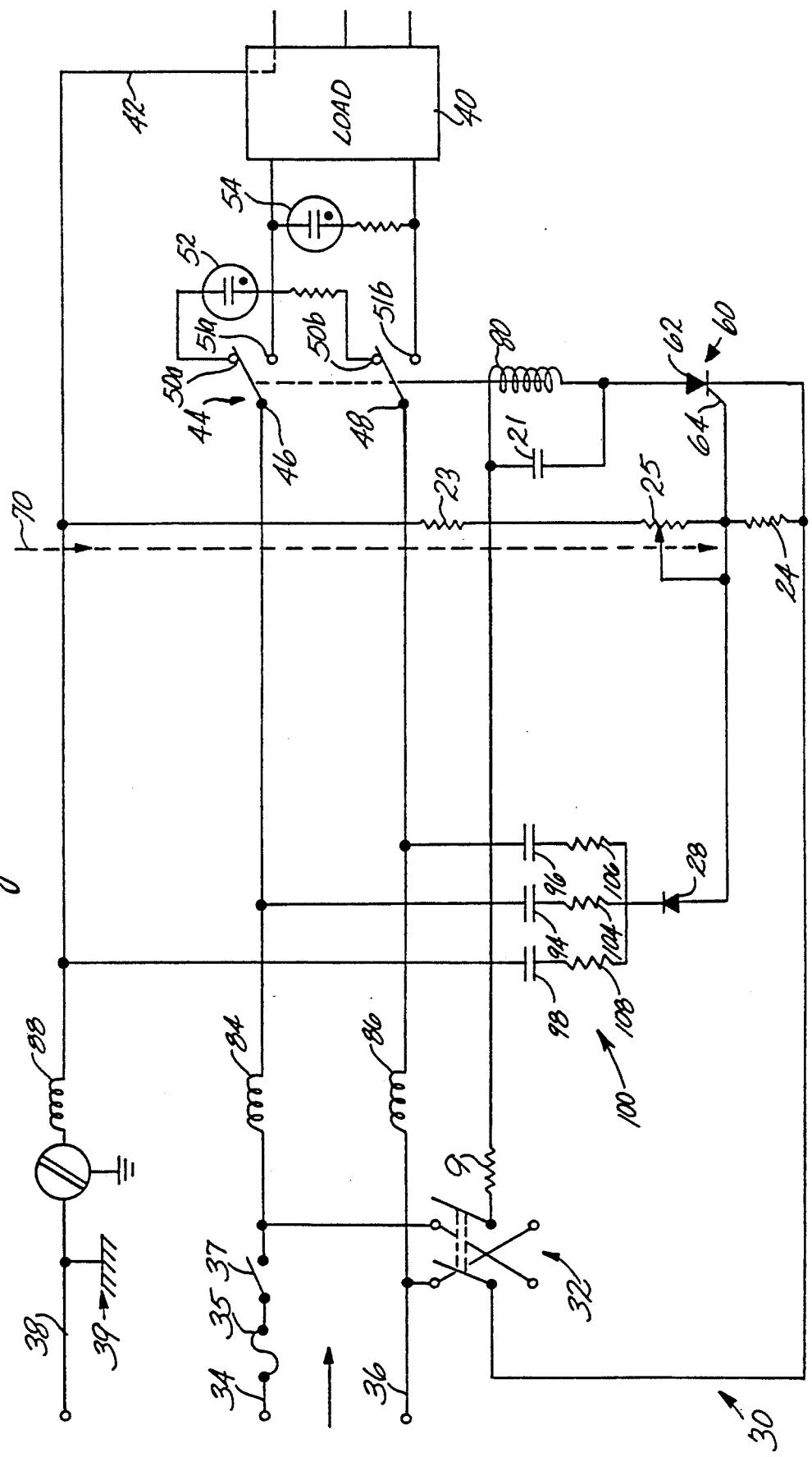
FIG. 2 is a schematic diagram of the electrical circuitry of a preferred embodiment of the invention.

Unfortunately, when electrical apparatus is connected to a 2-wire domestic electric outlet, it is generally impossible to determine which wire or contact of the outlet is hot and which is neutral. As shown in FIG. 2, one embodiment of the circuit of the invention (generally designated 30) solves this polarity problem by providing a polarity reversing means or switch 32. As discussed below, the polarity reversing means must be set correctly for the circuit of FIG. 2 to enable power supply to a load.

In the embodiment of FIG. 2, domestic alternating current input is provided on a hot line 34, neutral line 36, and ground line 38. Hot line 34 is coupled to polarity reversing means 32 and to relay pole 46 through a conventional fuse 35 and main power switch 37. As is known in the art, the circuit and the load cannot operate if the fuse or main power switch are open.

The ground line 38 is connected to the chassis of the load 40 or pest control equipment using line 42 and the hot and neutral lines are connected to poles 46, 48 of a DPDT power relay 44. When the relay is in the OFF position, contacts 50a, 50b are energized to cause a warning signal light 52 to be lit. No power is supplied to the load at this time.

To operate the load through the ground safety controller, a true earth ground source 39 must be connected to the ground input terminal 38 and the proper line polarity must be selected by the switch 32. The switch ascertains the "hot" or phase position of the feeder line which is generally unknown or may be wired incorrectly. The switch 32 can be a conventional toggle switch.

Ground line 38 is connected to a thyristor circuit 60 comprising thyristor 62, thyristor gate 64, and high-ohm sensing resistors 23 and 25. A power relay coil 80 is energized by voltage fed from resistors 23 and 25 to the thyristor gate. A capacitor 21 provides a discharge path, and a series resistor 9 provides current limiting for the relay coil 80. A diode 28, preferably an RF interference protection diode (also known in the art as a switching or a signal diode), is provided for rectification and balance.

As shown in the drawing, three RF chokes 84, 86 and 88 are coupled in lines 34, 36, 38. The chokes attenuate RF interference generated by an arc-over at the load and prevent the RF from coupling into the input power source, and also sharpen the Q of the system. Three capacitors 94, 96, 98 with series-connected resistors 104, 106, 108 provide a network 100 with three branches coupled from lines 34, 36, 38 to diode 28. Resistor R4 is coupled across the gate 64 of the main thyristor 62. Thus, the RF detection means can comprise the RF chokes, the resistor-capacitor network, and the diode.

In order to operate the ground safety controller, a true earth ground 39 is connected to the ground input terminal 38 and the proper line polarity is selected by means of toggle switch 32. The toggle switch 32 is used to determine the "hot" or phase position of the feeder line. If, for example, hot line 34 is actually neutral, no net potential can exist between the hot line and the ground line, and the result is that the ground safety controller will not be activated.

Under normal conditions with all grounding and phase conditions correct, a typical potential of, for example, 117 VAC will exist between ground line 38 and phase line 34. This voltage will be fed over two high-ohm sensing resistors 23 and 25 to thyristor gate 64 of the thyristor 62 causing the thyristor to energize the relay coil 80. The relay contacts then switch to positions 51a and 51b, which applies power to the load. The relay switching current is attenuated by resistor 9 and the capacitor 21 is connected in parallel to the relay coil 80 to prevent relay chatter due to the pulsing functioning thyristor 62. Thus, capacitor 21 smooths or filters the pulsed voltage output of the thyristor.

When RF interference enters backwards into the feeder line from the LOAD (feeding the connected equipment), the RF will be "seen" by the capacitors (94, 96, 98), and rectified by the diode 28, causing the diode to feed negative DC to the gate of the thyristor 62. Because the thyristor has lost its normally-positive gate 64 potential (as furnished via high-ohm resistors 23, 25), the thyristor stops conduction and the main power relay 80 drops out. Thus, contacts 51a and 51b are open and the LOAD receives no power.

When the LOAD is inoperative, generation of RF interference from the LOAD necessarily stops. The gate potential of the thyristor again becomes positive, which causes the thyristor 62 to resume normal conduction (provided that the required ground is in place), but the thyristor will stop again if RF interference still prevails.

Thus, when the LOAD is generating RF interference, a cyclic ON/OFF operation of the load occurs, alerting the operator of the load to a fault or arc-over. This situation will prevail as long as LOAD generates RF interference. Once the equipment operator has remedied the RF interference, the cyclic ON/OFF stops and the LOAD resumes normal, uninterrupted operation.

Heavy RF interference is caused if, for instance, the equipment operator draws a long, open arc with a termite machine's electro-gun. The cyclic mode will alert the operator that something is done wrong. Of course, any item that generates undesirable RF interference, in industrial or medical equipment, etc., will benefit from this device.

Referring again to FIG. 2, the aforementioned functions are made possible by the reactive properties of capacitors 94, 96, 98. According to the formula $$X_c = \frac{1}{2\pi f C},$$

a given capacitor's impedance $X_c$ decreases (attains a lower "ohmic" value) as line frequency f is increased. If, for example, a capacitor is rated at 350 pf and operated at a line frequency of 60 Hz, its impedance is 5,000,000 ohms. If, however, the same 530 pf capacitor is operated at 67,000 hz, its impedance drops down to 4,478 ohms. This dramatic drop allows diode 28 to generate enough current to turn thyristor 62 off, here by applying negative voltage to gate 64. Thus, the high impedance of the capacitors sets up a high impedance safety path 70 between the power source and the thyristor. The three series-connected resistors, 104, 106, 108 are selected such as not to allow an excessively large current to flow when one or all three capacitors operate in their respective low-reactance modes in the presence of RF.

Preferred values for the capacitors are 530 pf and for the resistors 104, 106, 108 are 1MΩ.

The frequency of the cyclic switching between ON-/OFF conditions can be determined by appropriate selection of time constants (t=RC) for capacitor 21 and resistor 9 which function as a timing means. Preferred values are 1.5 MFD and 1.5K, respectively. The cyclic ON/OFF is visually confirmed by lamps 13 and 15 showing red for OFF and green for ON, respectively.

As indicated previously, the invention is useful to prevent electric shock and/or unsafe operating conditions due to absence of earth ground. In such a case, the connected equipment cannot be turned on and operated if no earth ground is present. If feed lines or cables are connected as depicted in FIG. 1, the ground line 38 is not connected to a true earth ground, and the red light 52 would be lit. The operator would then flip the toggle switch 32 for preliminary testing. A no-ground condition would be prevailing if the red light continues to remain lit and must be rectified. Once the operator has attached a viable ground line, the toggle switch 32 is activated again to establish proper phase polarity versus ground. If the system is operating correctly, the green light 54 would then be lit and power applied to the load.

It is apparent that since no sensing diodes and similar circuit elements are used, the ground safety controller of the invention is intrinsically safe to operate. Electro-biological shock hazards are eliminated, and the controller shuts off immediately when the earth ground is removed and signals the OFF condition to the equipment operator. Restoring the ground to the circuit restores equipment operations.

It is apparent from the foregoing that various changes and modifications may be made without departing from the invention. For example, other types of switches or switching circuitry are contemplated for use as a polarity reversal means; use of a double-throw, double-pole switch as shown in the drawings is not necessary.

What is claimed is:

1. A ground fault interrupter circuit comprising:
a source of electric power provided on hot, neutral, and ground lines;
a polarity reversal means coupled to the source of electric power for selectively providing a polarity-switched output on a plurality of output terminals;
relay means for interrupting power from the source of electric power to a load, the relay being coupled through a thyristor to the output terminals;
radio frequency (RF) interference detection means coupled from the source to the thyristor for interrupting conduction of the thyristor in response to RF interference from the load; and
wherein the RF interference detection means comprises a high-impedance safety path, having an impedance which is a function of radio frequency signals, coupled from the ground line to a gate of the thyristor.

2. The circuit of claim 1, wherein the source of electric power is provided from a high-voltage alternating current public utility transformer.

3. The circuit of claim 1, wherein the ground line is coupled to auxiliary coupling means for providing a true earth ground.

4. The circuit of claim 1, wherein the polarity reversal means comprises switch means having first and second input terminals respectively coupled to the hot and neutral lines, third and fourth input terminals respectively coupled to the neutral and hot lines, and first and second output poles selectively connectable either to the first and second input terminals or to the third and fourth input terminals.

5. The circuit of claim 1, wherein the polarity reversal means comprises a double-throw, double-pole switch.

6. The circuit of claim 5, wherein the switch comprises first and second input terminals coupled to the hot and neutral lines, the first and second input terminals being coupled to third and fourth input terminals using reverse polarity, and first and second output poles selectively connectable either to the first and second input terminals or to the third and fourth input terminals.

7. The circuit of claim 1, wherein the relay means comprises a relay coil coupled to double-pole, double-throw contacts.

8. The circuit of claim 1, further including a first fixed-value resistor coupling the polarity reversal means to a first terminal of the relay means, and wherein the thyristor is coupled from a second terminal of the relay means to the polarity reversal means.

9. The circuit of claim wherein the high-impedance safety path comprises at least one resistor and a capacitor coupled in series from the ground line to the gate of the thyristor.

10. The circuit of claim 1, further including a diode coupled from the gate to the high-impedance safety path.

11. The circuit of claim 1, wherein the RF interference detection mean includes rectifier means coupled to the thyristor to feed negative direct current to the thyristor gate in response to RF interference generated by the load.

12. The circuit of claim 1, wherein the high impedance safety path comprises a network of a plurality of series-coupled resistor-capacitor pairs, each pair being coupled from one of the hot, neutral, and ground lines to the thyristor.

13. The circuit of claim 11 wherein the high impedance safety path comprises a network of a plurality of resistor-capacitor pairs, each pair being coupled from one of the hot, neutral, and ground lines to the thyristor via a diode rectifier.

14. The circuit of claim 1, wherein the radio frequency interference detection means comprises: an RF choke in each of the ground, hot, and neutral lines; a resistor-capacitor pair coupled from each of the hot, neutral, and ground lines to a diode, the diode being coupled to a gate of the thyristor.

15. The circuit of claim 1 the RF interference detection means being responsive to RF interference on the hot, neutral, or ground lines, and in response thereto, causing a rectifier to feed negative direct current voltage to the thyristor.

16. The circuit of claim 1, wherein the RF interference detection means includes rectifier means for triggering the thyristor and the relay means to interrupt power to the load in response to detection of RF interference on the hot, neutral, or ground lines.

17. The circuit of claim 12, wherein the RF interference detection means includes rectifier means for triggering the thyristor and the relay means to interrupt power to the load in response to detection by at least one of the capacitors of RF interference on the hot, neutral, or ground lines.

18. A ground fault interrupter circuit comprising:
a source of electric power provided on hot, neutral, and ground lines:
switch means coupled to the source of electric power for selectively providing a polarity-switched output on a plurality of output terminals, the switch means having first and second input terminals respectively coupled to the hot and neutral lines, third and fourth input terminals respectively coupled to the neutral and hot lines, and first and second output poles selectively connectable either to the first and second input terminals or to the third and fourth input terminals;
relay means for interrupting power from the source of electric power to a load, the relay being coupled through a thyristor to the output terminals, the relay means comprising a relay coil coupled to double-pole, double-throw contacts;
radio frequency (RF) interference detection means comprising:
a high-impedance safety path, having an impedance which is a function of radio frequency signals, coupled from the ground line to a gate of the thyristor, comprising at least one high-impedance resistor and capacitor coupled from the ground line to the gate of the thyristor; and
a diode coupled from the gate to the high-impedance safety path.

19. The circuit of claim 18, wherein the source of electric power is provided from a high-voltage alternating current public utility transformer.

20. The circuit of claim 18, wherein the ground line is coupled to auxiliary coupling means for providing a true earth ground.

21. The circuit of claim 18, wherein the switch means comprises a double-throw, double-pole switch.

22. The circuit of claim 18, further including a first fixed-value resistor coupling the switch means to a first terminal of the relay means, and wherein the thyristor is coupled from a second terminal of the relay means to the switch means.

23. The circuit of claim 18, the RF interference detection means being responsive to RF interference on the hot, neutral, or ground lines, and in response thereto, causing the diode to feed negative direct current voltage to the thyristor.

24. The circuit of claim 18, wherein the radio frequency interference detection means comprises: an RF choke in each of the ground, hot, and neutral lines; a resistor-capacitor pair coupled from each of the hot, neutral, and ground lines to said diode.

25. The circuit of claim 18, wherein the high impedance safety path comprises a network of a plurality of the resistor-capacitor pairs.

* * * * *

UNITED STATES PATENT AND TRADEMARK OFFICE
CERTIFICATE OF CORRECTION

PATENT NO. : 5,179,490
DATED : January 12, 1993
INVENTOR(S) : Daniel J. Bondy

It is certified that error appears in the above-indentified patent and that said Letters Patent is hereby corrected as shown below:

In the Drawings:

Drawings, FIG. 2, add a tie point between 28 and 108/104/106.

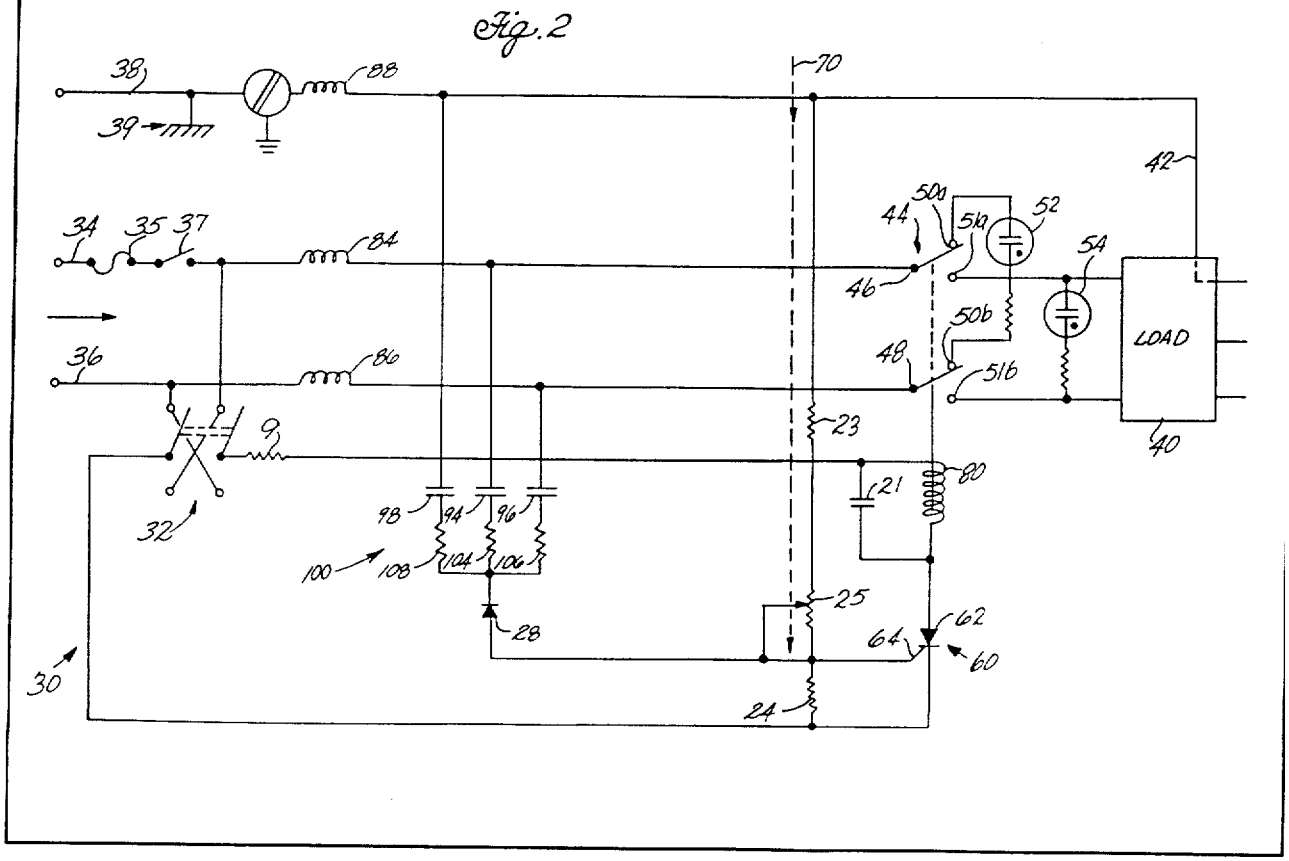

UNITED STATES PATENT AND TRADEMARK OFFICE
CERTIFICATE OF CORRECTION

PATENT NO. : 5,179,490
DATED : January 12, 1993
INVENTOR(S) : Daniel J. Bondy

It is certified that error appears in the above-indentified patent and that said Letters Patent is hereby corrected as shown below:

Column 1, line 13, change "A.C." to -- AC --.

Column 2, line 58, after "100,000" insert -- volt --.

Column 3, lines 44,50,58, change "A.C." to -- AC -- (all occurrences).

Column 4, line 17, change "power, switch" to -- power switch --.
Column 4, line 50, change "Resistor R4" to -- Resistor 24 --.

Column 5, line 4, change "reactive" to -- _reactive_ --.
Column 5, line 50, change "5,000,000" to -- 7,582,700 --.
Column 5, line 51, change "530 pf capacitor" to -- 350 pf capacitor --.
Column 5, line 52, change "67,000 hz" to -- 67,000 Hz --.
Column 5, line 52, change "4,478" to -- 6,790 --.
Column 5, line 54, change "62 off" to -- 62 _off_ --.
Column 5, line 63, change "530 pf" to -- 350 pf --.

Column 6, line 9, change "FIG. 1" to -- FIG. 2 --.

UNITED STATES PATENT AND TRADEMARK OFFICE
CERTIFICATE OF CORRECTION

PATENT NO.   : 5,179,490
DATED        : January 12, 1993
INVENTOR(S)  : Daniel J. Bondy It is certified that error appears in the above-indentified patent and that said Letters Patent is hereby corrected as shown below:

In the Claims:

Column 7, line 20, after "claim" insert -- 1 --.
Column 7, line 28, change "mean" to -- means --.
Column 7, line 48, after "claim 1" insert -- , wherein --.

Signed and Sealed this

Twenty-sixth Day of July, 1994

Attest:

BRUCE LEHMAN

Attesting Officer       Commissioner of Patents and Trademarks